United States Patent
Yu

(10) Patent No.: US 12,347,247 B2
(45) Date of Patent: Jul. 1, 2025

(54) METHOD AND APPARATUS FOR DETERMINING FAULT TOLERANT TIME INTERVAL (FTTI) OF AUTONOMOUS DRIVING ASSISTANCE SYSTEM

(71) Applicant: Robert Bosch GmbH, Stuttgart (DE)

(72) Inventor: Yingjie Yu, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 175 days.

(21) Appl. No.: 18/296,113

(22) Filed: Apr. 5, 2023

(65) Prior Publication Data
US 2023/0326262 A1 Oct. 12, 2023

(30) Foreign Application Priority Data
Apr. 7, 2022 (CN) .......................... 202210360147.6

(51) Int. Cl.
*G07C 5/02* (2006.01)
(52) U.S. Cl.
CPC ...................... *G07C 5/02* (2013.01)
(58) Field of Classification Search
CPC ........................................ G07C 5/02
See application file for complete search history.

(56) References Cited

U.S. PATENT DOCUMENTS

| | | | |
|---|---|---|---|
| 2019/0049342 A1* | 2/2019 | Anderson | G01C 21/3415 |
| 2019/0092320 A1* | 3/2019 | Nagata | B60W 30/09 |
| 2020/0117565 A1* | 4/2020 | Ponnuvel | G06F 11/2284 |

* cited by examiner

*Primary Examiner* — Gertrude Arthur Jeanglaude
(74) *Attorney, Agent, or Firm* — Maginot, Moore & Beck LLP

(57) ABSTRACT

A method for determining a fault tolerant time interval (FTTI) of an autonomous driving assistance system is disclosed. The method includes (i) receiving an emulation result and/or a vehicle test result, wherein the emulation result and/or the vehicle test result includes a relationship between a sensitive parameter and a fault duration, (ii) receiving a controllability study result; and (iii) determining the fault tolerant time interval (FTTI) from a database including the emulation result and/or the vehicle test result and the controllability study result on the basis of a safety target related to the sensitive parameter. An apparatus for determining a fault tolerant time interval (FTTI) of an autonomous driving assistance system, a computer storage medium, and a computer program product are also disclosed.

15 Claims, 3 Drawing Sheets

METHOD AND APPARATUS FOR DETERMINING FAULT TOLERANT TIME INTERVAL (FTTI) OF AUTONOMOUS DRIVING ASSISTANCE SYSTEM

This application claims priority under 35 U.S.C. § 119 to patent application no. CN 2022 1036 0147.6, filed on Apr. 7, 2022 in China, the disclosure of which is incorporated herein by reference in its entirety.

The present disclosure relates to the field of functional safety of vehicles, and more particularly, to a method and an apparatus for determining a fault tolerant time interval (FTTI) of an autonomous driving assistance system, a computer storage medium, and a computer program product.

BACKGROUND

With fast development of intelligent connected vehicles and autonomous vehicles, designing highly reliable and safe vehicle electronic systems attracts increasing attention from various parties, and functional safety is indispensable to system design of autonomous vehicles. ISO 26262 is an industry standard for functional safety of automotive electronic/electrical systems. The functional safety refers to "the absence of unreasonable risk due to hazards caused by malfunctioning behavior of electronic/electrical systems". That is, the functional safety focuses on whether the system, after systematic failures, can enter a safe state to avoid greater hazards, or reduce the probability of occurrence of hazards by means of safety measures, rather than the original function or performance of the system. Therefore, for the reliability and safety of an autonomous driving assistance system, the relevant assistance functions must comply with the above standard.

In functional safety, the fault tolerant time interval (FTTI) is a very important concept that provides key guidance for deriving time requirements (including detection and reaction times in safety mechanisms) in functional safety concepts. The second edition of ISO 26262 defines the FTTI as follows: minimum time-span from the occurrence of a fault in a relevant item to a possible occurrence of a hazardous event, if the safety mechanisms are not activated.

Currently, a fault tolerant time interval (FTTI) of an autonomous driving assistance system is determined mainly on the basis of experience, and no quantitative indicator is available for clear determination. Therefore, a determined and acquired fault tolerant time interval (FTTI) has a relatively large error. In addition, different original equipment manufacturers have different understanding of the end point of the fault tolerant time interval, which also brings obstacles to determination of the fault tolerant time interval (FTTI).

SUMMARY

According to an aspect of the present disclosure, provided is a method for determining a fault tolerant time interval (FTTI) of an autonomous driving assistance system, the method comprising: receiving an emulation result and/or a vehicle test result, wherein the emulation result and/or the vehicle test result comprises a relationship between a sensitive parameter and a fault duration; receiving a controllability study result; and determining the fault tolerant time interval (FTTI) from a database comprising the emulation result and/or the vehicle test result and the controllability study result on the basis of a safety target related to the sensitive parameter.

As an addition or alternative to the above solution, in the above method, the emulation result and/or the vehicle test result comprises a relationship between a lateral offset L and a fault duration t in a failure mode in which a vehicle steering assist fails.

As an addition or alternative to the above solution, in the above method, the controllability study result comprises: a driver reaction time t1, a driver control time t2 from placement of the hands of a driver on a steering wheel to a maximum lateral offset, and a vehicle lateral offset d within the driver control time t2.

As an addition or alternative to the above solution, in the above method, determining the fault tolerant time interval (FTTI) from a database comprising the emulation result and/or the vehicle test result and the controllability study result on the basis of a safety target related to the sensitive parameter comprises: determining a target lateral offset value on the basis of the safety target; and determining the fault tolerant time interval (FTTI) in the database on the basis of the target lateral offset value.

As an addition or alternative to the above solution, in the above method, determining a target lateral offset value on the basis of the safety target comprises: determining, on the basis of the safety target, that a hazardous event is that a vehicle is crossing a lane boundary; and determining the target lateral offset value L_target according to the following formula: L_target=(W_lane−W_vehicle)/2, where W_lane is a lane width, and W_vehicle is a vehicle width.

As an addition or alternative to the above solution, in the above method, determining a target lateral offset value on the basis of the safety target comprises: determining, on the basis of the safety target, that a hazardous event is that the driver is unable to control a vehicle to remain in a current lane; and determining the target lateral offset value L_target according to the following formula: L_target=(W_lane−W_vehicle)/2−d, where W_lane is a lane width, W_vehicle is a vehicle width, and d is the vehicle lateral offset within the driver control time t2.

According to another aspect of the present disclosure, provided is an apparatus for determining a fault tolerant time interval (FTTI) of an autonomous driving assistance system, the apparatus comprising: a first receiving device for receiving an emulation result and/or a vehicle test result, wherein the emulation result and/or the vehicle test result comprises a relationship between a sensitive parameter and a fault duration; a second receiving device for receiving a controllability study result; and a determining device for determining the fault tolerant time interval (FTTI) from a database comprising the emulation result and/or the vehicle test result and the controllability study result on the basis of a safety target related to the sensitive parameter.

As an addition or alternative to the above solution, in the above apparatus, the emulation result and/or the vehicle test result comprises a relationship between a lateral offset L and a fault duration t in a failure mode in which a steering assist fails.

As an addition or alternative to the above solution, in the above apparatus, the controllability study result comprises: a driver reaction time t1, a driver control time t2 from placement of the hands of a driver on a steering wheel to a maximum lateral offset, and a vehicle lateral offset d within the driver control time t2.

As an addition or alternative to the above solution, in the above apparatus, the determining device comprises: a first determining unit for determining a target lateral offset value on the basis of the safety target; and a second determining unit for determining the fault tolerant time interval (FTTI) in the database on the basis of the target lateral offset value.

As an addition or alternative to the above solution, in the above apparatus, the first determining unit is configured to: determine, on the basis of the safety target, that a hazardous event is that a vehicle is crossing a lane boundary; and determine the target lateral offset value L_target according to the following formula: L_target=(W_lane−W_vehicle)/2, where W_lane is a lane width, and W_vehicle is a vehicle width.

As an addition or alternative to the above solution, in the above apparatus, the first determining unit is configured to: determine, on the basis of the safety target, that a hazardous event is that the driver is unable to control a vehicle to remain in a current lane; and determine the target lateral offset value L_target according to the following formula: L_target=(W_lane−W_vehicle)/2−d, where W_lane is a lane width, and W_vehicle is a vehicle width, d being the vehicle lateral offset within the driver control time t2.

According to yet another aspect of the present disclosure, provided is a computer storage medium, comprising an instruction, wherein the instruction, when being run, implements the above method.

According to yet another aspect of the present disclosure, provided is a computer program product, comprising a computer program, wherein the computer program, when executed by a processor, implements the above method.

In the solution for determining an FTTI of an autonomous driving assistance system according to embodiments of the present disclosure, a suitable fault tolerant time interval (FTTI) is adaptively selected from a database comprising an emulation result and/or a vehicle test result and a controllability study result on the basis of different customer requirements (e.g., different safety targets related to a sensitive parameter). This solution can meet different customer requirements, and provide certain flexibility in determining the FTTI. In addition, in contrast to the method of determining an FTTI on the basis of experience in the prior art, the solution for determining an FTTI of an autonomous driving assistance system according to the embodiments of the present disclosure is more reasonable and specific, and is highly operable.

BRIEF DESCRIPTION OF THE DRAWINGS

The foregoing and other objectives and advantages of the present disclosure will be made more complete and clearer from the following detailed description provided with reference to the accompanying drawings, wherein the same or similar elements use the same reference numerals.

DETAILED DESCRIPTION

In the following, a safety control solution for an autonomous driving assistance system according to various exemplary embodiments of the present disclosure will be described in detail with reference to the accompanying drawings.

Figure 1:
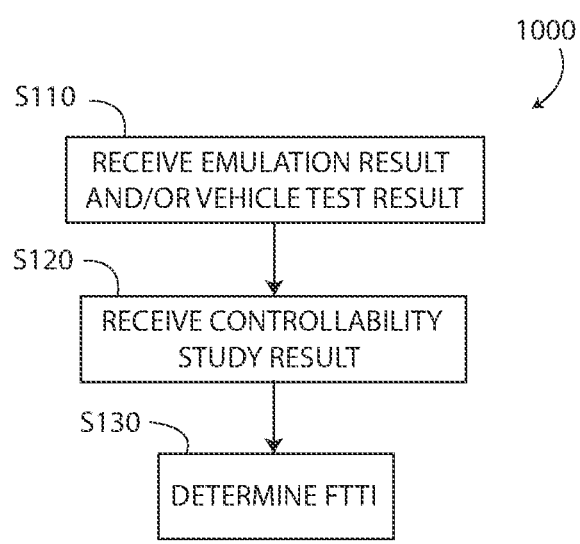
FIG. 1 shows a schematic flowchart of a method for determining a fault tolerant time interval (FTTI) of an autonomous driving assistance system according to an embodiment of the present disclosure.

FIG. 1 shows a schematic flowchart of a method 1000 for determining a fault tolerant time interval (FTTI) of an autonomous driving assistance system according to an embodiment of the present disclosure. As shown in FIG. 1, the method 1000 for determining a fault tolerant time interval (FTTI) of an autonomous driving assistance system includes the following steps:

in step S110, receiving an emulation result and/or a vehicle test result, wherein the emulation result and/or the vehicle test result includes a relationship between a sensitive parameter and a fault duration;

in step S120, receiving a controllability study result; and in step S130, determining the fault tolerant time interval (FTTI) from a database including the emulation result and/or the vehicle test result and the controllability study result on the basis of a safety target related to the sensitive parameter.

In the context of the present disclosure, the "autonomous driving assistance system" may be an ADAS system, i.e., an advanced driver assistance system, which, at any time during traveling of a vehicle, utilizes various sensors (a millimeter-wave radar, a lidar, a monocular/binocular camera, and satellite navigation) installed on the vehicle to sense the surrounding environment, acquire data, and identify, detect, and track static and dynamic objects, and performs system computation and analysis with reference to navigation map data, so as to enable the driver to perceive a potential danger in advance, thereby effectively improving the comfort and safety of vehicle driving.

The fault tolerant time interval (FTTI) refers to a minimum time interval from the occurrence of a fault in a relevant item to a possible occurrence of a hazardous event in the case that safety mechanisms are not activated. For example, a fault occurs suddenly during normal operation of the system. After the safety mechanism of the system detects the fault, the system is configured to enter a safe state. The period of time from the occurrence of the fault to the time when the system enters the safe state (or the time when a hazard may occur) is the so-called FTTI.

According to the definition of the fault tolerant time interval, the starting point of the fault tolerant time interval (FTTI) is clear. That is, the starting point is after the occurrence of the fault. However, understanding of the end point of the FTTI may vary: the "hazardous event" may be interpreted by original equipment manufacturers in a plurality of manners. More specifically, a lateral fault (e.g., a steering assist failure) is used as an example, and some believe that the time when a "hazardous event" occurs may be the time when a vehicle crosses a lane boundary. However, it is also believed that controllability of a driver also needs to be taken into account. That is, a safe buffer is required, and then 20 cm before reaching a lane boundary is correct. Moreover, some believe that crossing a lane boundary is not a dangerous event, because it is very likely that an adjacent vehicle is traveling in the center of a lane instead of in a position close to a lane boundary. It is obviously not easy for a different understanding to convince other voices, so that it is difficult to determine the fault tolerant time interval (FTTI).

The "fault tolerant time interval (FTTI)" mentioned in the present application is prevented as much as possible from representing any one of the above voices. Instead, a plurality of solutions are provided for different customer requirements (e.g., different safety targets). In this way, different customer requirements may have respective answers, thereby achieving flexibility and conserving time/money.

In step S110, an emulation result and/or a vehicle test result is received. In one or more embodiments, the target of performing an emulation test is to acquire a basic fault tolerant time interval (FTTI) under certain conditions. For example, software emulation can be performed by using CarMaker or Simulink. Before emulation, an operational design domain needs to be configured first, including a vehicle speed, a lane radius, a lane width, a failure mode, etc.

In the context of the present disclosure, the emulation result includes a relationship between a sensitive parameter and a fault duration. Here, the sensitive parameter refers to a vehicle parameter related to a safety target. For example, for lateral control of a vehicle, a lateral offset (relative to a lane centerline) is a sensitive parameter. The fault duration refers to a duration from the occurrence of a fault. For example, in a failure mode in which a steering assist fails, the relationship between the lateral offset and the fault duration shown in Table 1 is acquired by means of emulation (e.g., the vehicle speed being 120 km/h, the lane radius being 1500 meters, etc.):

TABLE 1

| Emulation Results | | | |
|---|---|---|---|
| Lateral offset L | 0.55 m | 0.85 m | 0.975 m |
| Fault duration | 1.4 s | 1.8 s | 1.9 s |

It can be understood that in Table 1, the lateral offset increases as the fault duration increases. Additionally, Table 1 is merely illustrative. Persons skilled in the art understand that the granularity of the table can be adjusted as desired.

A vehicle test is typically the last test before a product goes into the market. The higher the sufficiency of the vehicle test, the less the exposed problems of the vehicle after sales in the market. In one or more embodiments, the vehicle test result also includes the relationship between the sensitive parameter and the fault duration. Here, the sensitive parameter refers to a vehicle parameter related to a safety target. For example, for lateral control of a vehicle, a lateral offset (relative to a lane centerline) is a sensitive parameter. The fault duration refers to a duration from the occurrence of a fault. For example, in a failure mode in which a steering assist fails, the relationship between the lateral offset and the fault duration shown in Table 2 is acquired by means of a vehicle test (e.g., the vehicle speed being 120 km/h, the lane radius being 1500 meters, etc.):

TABLE 2

| Vehicle Test Results | | | |
|---|---|---|---|
| Lateral offset L | 0.55 m | 0.85 m | 0.975 m |
| Fault duration | 1.2 s | 1.6 s | 1.7 s |

It can be understood that in Table 2, the lateral offset increases as the fault duration increases. Additionally, Table 2 is merely illustrative. Persons skilled in the art understand that the granularity of the table can be adjusted as desired. Also, it can be learned, by comparing the emulation results and the vehicle test results, that there are certain differences therebetween. For example, for the same lateral offset L=0.85 m, the corresponding fault duration in the emulation result is 1.8 s, while the corresponding fault duration in the vehicle test result is 1.6 s.

The vehicle test and the emulation test have respective advantages and disadvantages. For example, the vehicle test requires more manpower and a larger area, resulting in higher costs. In addition, since uncontrollable external factors are present in a vehicle test process, vehicle test results may contain some fluctuations. However, the vehicle test takes account of differences between mechanical capabilities of different mass-produced vehicles, which is important to a time sensitive test. Thus, to balance costs against test result accuracy, it is advantageous to acquire emulation results (including the relationship between the sensitive parameter and the fault duration) first, then use (in comparison with the emulation results, a very small number of) vehicle tests to cross-validate the emulation results, and adjust a final result (i.e., the relationship between the sensitive parameter and the fault duration).

In one or more embodiments, the difference between the emulation result and the vehicle test result can also be used to adjust a final calculation result in the case that only the emulation result can be acquired.

In step S120, a controllability study result is received. A target of a controllability study is to acquire a driver reaction time and control time in a corresponding failure mode. For example, in a failure mode in which the steering assist fails (on a bend), a lateral offset occurs after the fault occurs. A time period between the occurrence of a fault and placement of the two hands of a driver on a steering wheel is referred to as t1. A time period from placement of the two hands on the steering wheel to a maximum lateral offset is referred to as t2. A lateral offset in the time period t2 is referred to as d. In this way, t1 is the driver reaction time, and t2 is the driver control time.

Thus, in an embodiment, the controllability study result may include: a driver reaction time t1, a driver control time t2 from placement of the hands of a driver on a steering wheel to a maximum lateral offset, and a vehicle lateral offset d within the driver control time t2.

In an embodiment, step S130 includes: determining a target lateral offset value on the basis of the safety target; and determining the fault tolerant time interval (FTTI) in the database on the basis of the target lateral offset value.

In particular, the target lateral offset value may vary with the safety target or the safe state. In an embodiment, determining a target lateral offset value on the basis of the safety target includes: determining, on the basis of the safety target, that a hazardous event is that a vehicle is crossing a lane boundary; and determining the target lateral offset value L_target according to the following formula: L_target= (W_lane−W_vehicle)/2, where W_lane is a lane width, and W_vehicle is a vehicle width.

For example, for the lane width of 3.75 m, the vehicle width of 1.8 m, the vehicle speed of 120 km/h, and the lane radius of 1500 meters, when the end point of the FTTI is interpreted as "crossing a lane boundary" according to customer requirements (or a safety target), the target lateral offset value (also referred to as a free space value of a lateral offset) calculated according to the above formula is 0.975 m. The database (the database is on, e.g., a development platform, and includes the emulation result and/or the vehicle test result and the controllability study result) is searched to acquire a corresponding fault duration value, and the value is the FTTI. The Vehicle Test Result Table 2 is used as an example, and it can be learned that the fault tolerant time interval is 1.9 s.

For another example, for the lane width of 3.5 m, the vehicle width of 1.8 m, the vehicle speed of 120 km/h, and the lane radius of 1500 meters, when the end point of the FTTI is interpreted as "crossing a lane boundary" according to customer requirements (or a safety target), the target lateral offset value (also referred to as a free space value of a lateral offset) calculated according to the above formula is 0.85 m. The database (the database is on, e.g., a development platform, and includes the emulation result and/or the vehicle test result and the controllability study result) is searched to acquire a corresponding fault duration value, and the value is the FTTI. The Vehicle Test Result Table 2 is used as an example, and it can be learned that the fault tolerant time interval is 1.8 s.

In another embodiment, determining a target lateral offset value on the basis of the safety target includes: determining, on the basis of the safety target, that a hazardous event is that the driver is unable to control a vehicle to remain in a current lane; and determining the target lateral offset value L_target according to the following formula: L_target=(W_lane−W_vehicle)/2−d, where W_lane is a lane width, and W_vehicle is a vehicle width, d being the vehicle lateral offset within the driver control time t2.

For example, for the lane width of 3.5 m, the vehicle width of 1.8 m, the vehicle speed of 120 km/h, and the lane radius of 1500 meters, when the end point of the FTTI is interpreted as "at a certain buffer distance from a lane boundary, the distance corresponding to a driver control time" as required by a customer (or a safety target), the target lateral offset value (also referred to as a free space value of a lateral offset) calculated according to the above formula is 0.85−0.3=0.55 m. The database (including the emulation result and/or the vehicle test result and the controllability study result) is searched. The Vehicle Test Result Table 2 is used as an example, and it can be learned that the fault tolerant time interval is 1.4 s.

As previously described, Table 2 is merely illustrative. Persons skilled in the art understand that the granularity of the table can be adjusted as desired. The smaller the granularity of records of the table in the database, more flexibly can the fault tolerant time interval (FTTI) corresponding to each safety target (corresponding to different customer requirements) be acquired or processed thereby.

Additionally, it would be readily appreciated by those skilled in the art that the method for determining a fault tolerant time interval (FTTI) of an autonomous driving assistance system provided by one or more embodiments of the present disclosure may be implemented by a computer program. For example, the computer program is included in a computer program product, and when executed by a processor, the computer program implements the method for determining a fault tolerant time interval (FTTI) of an autonomous driving assistance system according to one or more embodiments of the present disclosure. For another example, when a computer storage medium (e.g., a USB flash drive) storing the computer program is connected to a computer, the method for determining a fault tolerant time interval (FTTI) of an autonomous driving assistance system according to one or more embodiments of the present disclosure can be implemented by executing the computer program.

Figure 2:
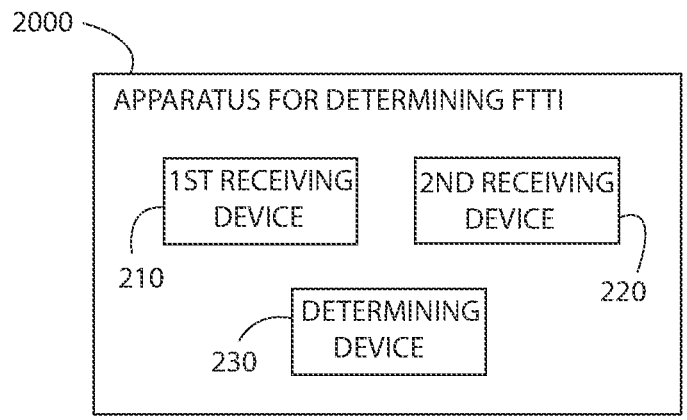
FIG. 2 shows a schematic structural view of an apparatus for determining a fault tolerant time interval (FTTI) of an autonomous driving assistance system according to an embodiment of the present disclosure.

Referring to FIG. 2, FIG. 2 shows a schematic structural view of an apparatus 2000 for determining a fault tolerant time interval (FTTI) of an autonomous driving assistance system according to an embodiment of the present disclosure. As shown in FIG. 2, the apparatus 2000 for determining a fault tolerant time interval (FTTI) of an autonomous driving assistance system includes: a first receiving device 210, a second receiving device 220, and a determining device 230. The first receiving device 210 is for receiving an emulation result and/or a vehicle test result, wherein the emulation result and/or the vehicle test result includes a relationship between a sensitive parameter and a fault duration. The second receiving device 220 is for receiving a controllability study result. The determining device 230 is for determining the fault tolerant time interval (FTTI) from a database including the emulation result and/or the vehicle test result and the controllability study result on the basis of a safety target related to the sensitive parameter.

In one or more embodiments, in the above apparatus 2000, the emulation result and/or the vehicle test result includes a relationship between a lateral offset L and a fault duration t in a failure mode in which a steering assist fails.

In one or more embodiments, the controllability study result includes: a driver reaction time t1, a driver control time t2 from placement of the hands of a driver on a steering wheel to a maximum lateral offset, and a vehicle lateral offset d within the driver control time t2.

Figure 4:
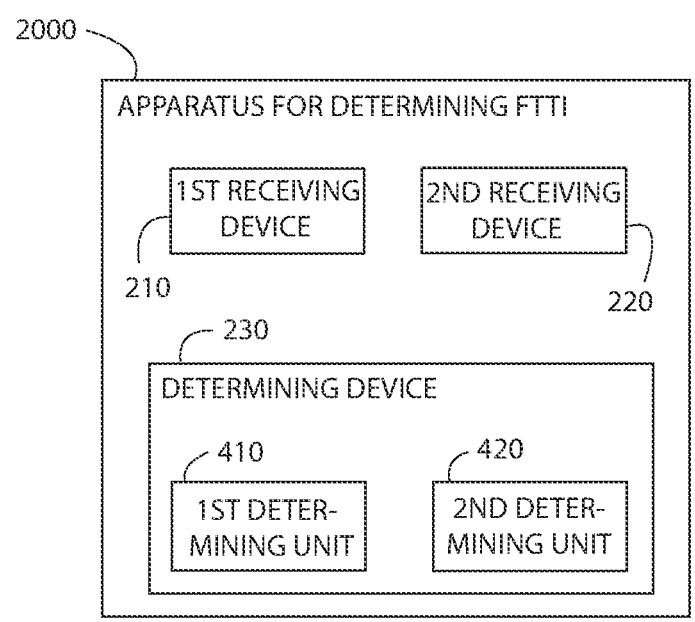
FIG. 4 shows a schematic structural view of an apparatus for determining a fault tolerant time interval (FTTI) of an autonomous driving assistance system according to an embodiment of the present disclosure.

In one or more embodiments, as shown in FIG. 4 (note: the components in FIG. 4 that are the same as those in FIG. 2 are denoted by the same reference signs, and will not be described herein again), the determining device 230 includes: a first determining unit 410 for determining a target lateral offset value on the basis of the safety target; and a second determining unit 420 for determining the fault tolerant time interval (FTTI) in the database on the basis of the target lateral offset value.

In an embodiment, the first determining unit 410 may be configured to: determine, on the basis of the safety target, that a hazardous event is that a vehicle is crossing a lane boundary; and determine the target lateral offset value L_target according to the following formula: L_target= (W_lane−W_vehicle)/2, where W_lane is a lane width, and W_vehicle is a vehicle width.

In another embodiment, the first determining unit 410 may be configured to: determine, on the basis of the safety target, that a hazardous event is that the driver is unable to control a vehicle to remain in a current lane; and determine the target lateral offset value L_target according to the following formula: L_target=(W_lane−W_vehicle)/2−d, where W_lane is a lane width, and W_vehicle is a vehicle width, d being the vehicle lateral offset within the driver control time t2.

In one or more embodiments, after the fault tolerant time interval (FTTI) is determined, safety mechanisms (including, but not limited to, a monitoring time, a reaction time, etc.) of individual related assemblies such as a steering system, a sensing unit, an actuator, a processor, etc., can be guided and assigned on the basis of the fault tolerant time interval (FTTI).

Figure 3:
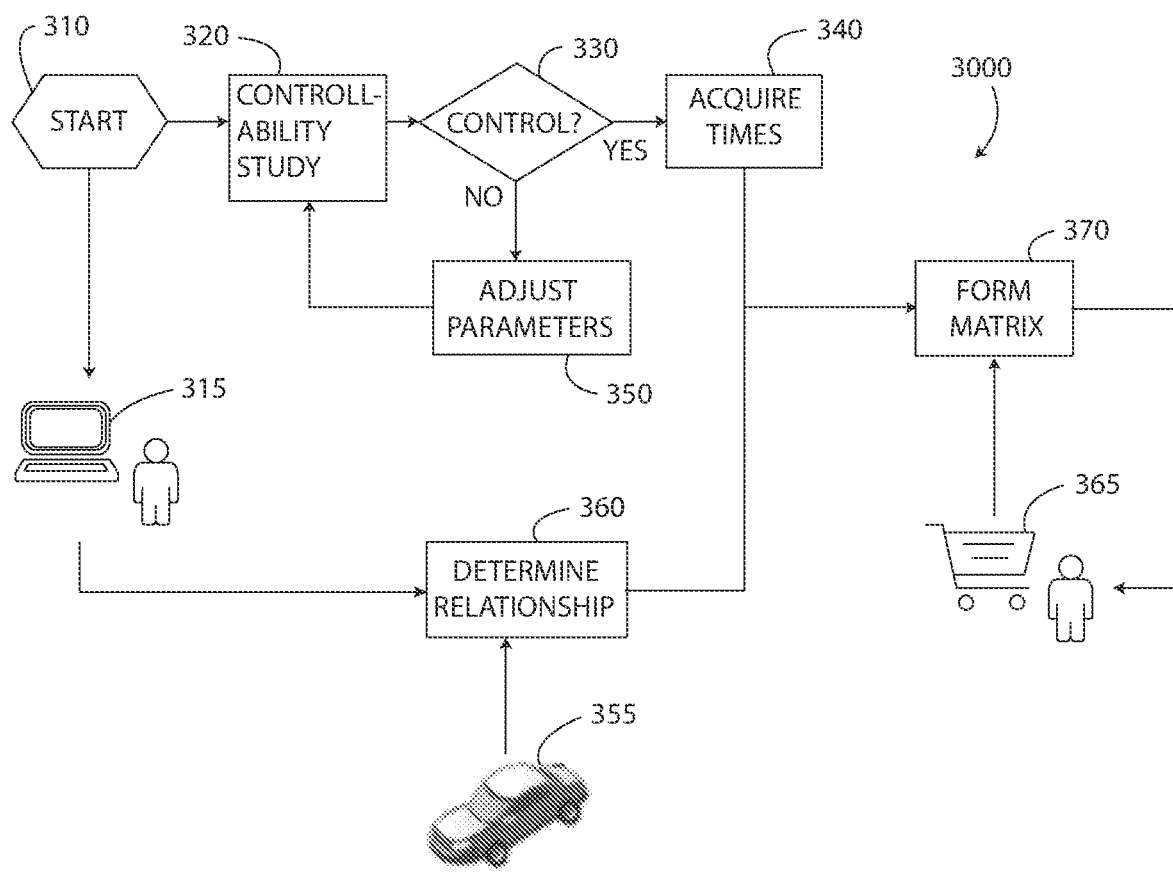
FIG. 3 shows a schematic flowchart of a method for determining a fault tolerant time interval (FTTI) of an autonomous driving assistance system according to an embodiment of the present disclosure.

Referring to FIG. 3, FIG. 3 shows a schematic flowchart of a method 3000 for determining a fault tolerant time interval (FTTI) of an autonomous driving assistance system according to an embodiment of the present disclosure. As shown in FIG. 3, the method 3000 begins at step 310. To acquire a fault tolerant time interval (FTTI), an emulation test needs to be performed, as shown in 315. In addition, to acquire the fault tolerant time interval (FTTI), a controllability study is also required, as shown in 320. After the controllability study 320 is performed, it is determined in step 330 whether a vehicle is controllable, and if not, step 350 is performed to adjust parameters (such as a vehicle speed, a curvature, etc.), and the controllability study 320 is performed again. If it is determined in step 330 that the vehicle is controllable, a driver reaction time t1, a driver control time t2, and a lateral offset d in the driver control time t2 are acquired in step 340.

In another aspect, in addition to the emulation test shown in 315, a vehicle test 355 may also be performed. The vehicle test 355 may be used to cross-validate and/or adjust an emulation test result. In step 360, a relationship between the lateral offset and a time is determined.

In this way, an FTTI matrix 370 can be formed on the basis of a controllability study result (i.e., the driver reaction time t1, the driver control time t2, and the lateral offset d in the driver control time t2) acquired in step 340 and a result (i.e., the relationship between the lateral offset and the time) determined in step 360. The FTTI matrix 370 may be used to determine a suitable fault tolerant time interval (FTTI) according to different customer requirements 365.

In summary, in the solution for determining an FTTI of an autonomous driving assistance system according to the embodiments of the present disclosure, a suitable fault tolerant time interval (FTTI) is adaptively selected from a database including an emulation result and/or a vehicle test result and a controllability study result on the basis of different customer requirements (e.g., different safety targets related to a sensitive parameter). This solution can meet different customer requirements, and provide certain flexibility in determining the FTTI. In addition, in contrast to the method of determining an FTTI on the basis of experience in the prior art, the solution for determining an FTTI of an autonomous driving assistance system according to the embodiments of the present disclosure is more reasonable and specific, and is highly operable.

Although the above specification describes only some embodiments of the present disclosure, it would be appreciated by those of ordinary skill in the art that the present disclosure can be implemented in many other forms without departing from the spirit or scope thereof. Therefore, the illustrated examples and embodiments are regarded as illustrative and non-limiting, and the present disclosure may encompass various modifications and substitutions without departing from the spirit and scope of the present disclosure as defined by the appended claims.

What is claimed is:

1. A method for operating a safety mechanism of a vehicle based on a determined fault tolerant time interval ("FTTI") of an item of the vehicle, the vehicle having an autonomous driving assistance system, the method comprising:
   receiving an emulation result and/or a vehicle test result of the vehicle, wherein the emulation result and/or the vehicle test result comprises a relationship between a sensitive parameter and a fault duration;
   receiving a controllability study result;
   determining the FTTI from a database comprising the emulation result and/or the vehicle test result and the controllability study result on the basis of a safety target related to the sensitive parameter, wherein the determined FTTI is a time span from an occurrence of a fault in the item of the vehicle to a possible occurrence of a hazardous event, if a safety mechanism of the vehicle is not activated;
   configuring the safety mechanism of the vehicle based on the FTTI, the fault in the item of the vehicle, and the hazardous event; and
   operating the vehicle and the configured safety mechanism of the vehicle.

2. The method according to claim 1, wherein:
   the emulation result and/or the vehicle test result comprises a relationship between a lateral offset and a fault duration in a failure mode in which a steering assist fails,
   the lateral offset is the sensitive parameter, and
   the steering assist is the safety mechanism of the vehicle.

3. The method according to claim 2, wherein the controllability study result comprises:
   a driver reaction time,
   a driver control time from placement of the hands of a driver on a steering wheel to a maximum lateral offset, and
   a vehicle lateral offset within the driver control time.

4. The method according to claim 3, wherein determining the FTTI from a database comprising the emulation result and/or the vehicle test result and the controllability study result on the basis of a safety target related to the sensitive parameter comprises:
   determining a target lateral offset value on the basis of the safety target; and
   determining the FTTI in the database on the basis of the target lateral offset value.

5. The method according to claim 4, wherein determining a target lateral offset value on the basis of the safety target comprises:
   determining, on the basis of the safety target, that the hazardous event is that a vehicle is crossing a lane boundary; and
   determining the target lateral offset value according to the following formula: the target lateral offset value= (W_lane−W_vehicle)/2, where W_lane is a lane width, and W_vehicle is a vehicle width.

6. The method according to claim 4, wherein determining a target lateral offset value on the basis of the safety target comprises:
   determining, on the basis of the safety target, that the hazardous event is that the driver is unable to control a vehicle to remain in a current lane; and
   determining the target lateral offset value according to the following formula: the target lateral offset value= (W_lane−W_vehicle)/2−d, where W_lane is a lane width, W_vehicle is a vehicle width, and d is the vehicle lateral offset within the driver control time.

7. A non-transitory computer storage medium, comprising instructions, wherein:
   the instructions, when being run, implement the method according to claim 1.

8. A computer program product, comprising a computer program, wherein:
   the computer program, when executed by a processor, implements the method according to claim 1.

9. The method according to claim 1, wherein operating the safety mechanism comprises:
   detecting the occurrence of the fault in the item of the vehicle; and
   activating the safety mechanism less than the FTTI after the detecting the occurrence of the fault so that the safety mechanism prevents the hazardous event.

10. An apparatus for determining a fault tolerant time interval ("FTTI") of an item of a vehicle, the vehicle having an autonomous driving assistance system, the apparatus comprising:
    a first receiving device configured to receive an emulation result and/or a vehicle test result of the vehicle, wherein the emulation result and/or the vehicle test result comprises a relationship between a sensitive parameter and a fault duration;

a second receiving device configured to receive a controllability study result; and a determining device operably connected to the first receiving device and the second receiving device, the determining device configured to determine the FTTI from a database comprising the emulation result and/or the vehicle test result and the controllability study result on the basis of a safety target related to the sensitive parameter, wherein the determined FTTI is a time span from an occurrence of a fault in the item of the vehicle to a possible occurrence of a hazardous event, if a safety mechanism of the vehicle is not activated, wherein the determined FTTI, the fault in the item of the vehicle, and the hazardous event is used to configure the safety mechanism of the vehicle, and wherein the vehicle is operated with the configured safety mechanism.

11. The apparatus according to claim 10, wherein:

the emulation result and/or the vehicle test result comprises a relationship between a lateral offset and a fault duration in a failure mode in which a steering assist fails, the lateral offset is the sensitive parameter, and the steering assist is the safety mechanism of the vehicle.

12. The apparatus according to claim 11, wherein the controllability study result comprises:

a driver reaction time, a driver control time from placement of the hands of a driver on a steering wheel to a maximum lateral offset, and a vehicle lateral offset within the driver control time.

13. The apparatus according to claim 12, wherein the determining device comprises:

a first determining unit configured to determine a target lateral offset value on the basis of the safety target; and a second determining unit configured to determine the FTTI in the database on the basis of the target lateral offset value.

14. The apparatus according to claim 13, wherein the first determining unit is configured to:

determine, on the basis of the safety target, that the hazardous event is that the vehicle is crossing a lane boundary; and determine the target lateral offset value according to the following formula: the target lateral offset value= (W_lane−W_vehicle)/2, where W_lane is a lane width, and W_vehicle is a vehicle width.

15. The apparatus according to claim 13, wherein the first determining unit is configured to:

determine, on the basis of the safety target, that the hazardous event is that the driver is unable to control the vehicle to remain in a current lane; and determine the target lateral offset value according to the following formula: the target lateral offset value= (W_lane−W_vehicle)/2−d, where W_lane is a lane width, W_vehicle is a vehicle width, and d is the vehicle lateral offset within the driver control time.

* * * * *